(12) United States Patent
Iwano et al.

(10) Patent No.: US 12,467,822 B2
(45) Date of Patent: Nov. 11, 2025

(54) UTILITY POLE DETERIORATION DISCRIMINATION DEVICE AND METHOD

(71) Applicant: NEC Corporation, Tokyo (JP)

(72) Inventors: Tadayuki Iwano, Tokyo (JP); Naoto Ogura, Tokyo (JP); Hiroaki Koshio, Tokyo (JP); Hideaki Takeda, Kanagawa (JP); Motohito Ebihara, Kanagawa (JP)

(73) Assignee: NEC CORPORATION, Tokyo (JP)

( * ) Notice: Subject to any disclaimer, the term of this patent is extended or adjusted under 35 U.S.C. 154(b) by 336 days.

(21) Appl. No.: 18/022,955

(22) PCT Filed: Aug. 31, 2020

(86) PCT No.: PCT/JP2020/032866
§ 371 (c)(1),
(2) Date: Feb. 23, 2023

(87) PCT Pub. No.: WO2022/044319
PCT Pub. Date: Mar. 3, 2022

(65) Prior Publication Data
US 2023/0341290 A1    Oct. 26, 2023

(51) Int. Cl.
*G01M 7/02*  (2006.01)
*G01H 9/00*  (2006.01)
(Continued)

(52) U.S. Cl.
CPC ............ *G01M 7/025* (2013.01); *G01H 9/004* (2013.01); *G01M 5/0025* (2013.01);
(Continued)

(58) Field of Classification Search
CPC .... G01H 9/004; G01M 7/025; G01M 5/0025; G01M 5/0091; G01M 5/0066; H02G 1/02; H02G 7/00
(Continued)

(56) References Cited

U.S. PATENT DOCUMENTS

2014/0278150 A1\* 9/2014 Baesler .................. E04H 12/00
702/34
2015/0355144 A1\* 12/2015 Bartuli .................. G01N 29/12
73/579
(Continued)

FOREIGN PATENT DOCUMENTS

CN     204286579 U  *  4/2015
CN     207866359 U  *  9/2018
(Continued)

OTHER PUBLICATIONS

Translation JP-2013072800 (Year: 2013).*
(Continued)

*Primary Examiner* — Peter J Macchiarolo
*Assistant Examiner* — Monica S Young
(74) *Attorney, Agent, or Firm* — Sughrue Mion, PLLC

(57) ABSTRACT

A deterioration discrimination system according to the present disclosure includes: an optical fiber cable (20) configured to be laid in a utility pole (10); a communication unit (31) configured to receive an optical signal from optical fibers (21) included in the optical fiber cable (20); a detection unit (32) configured to detect, based on the optical signal received by the communication unit (31), vibrations that are generated in the utility pole (10); and a discrimination unit (41) configured to discriminate, based on a vibration frequency of the vibrations that are generated during a specified period among the vibrations that are detected by the detection unit (32), deterioration of the utility pole (10).

9 Claims, 13 Drawing Sheets

(51) Int. Cl.
G01M 5/00 (2006.01)
H02G 1/02 (2006.01)
H02G 7/00 (2006.01)

(52) U.S. Cl.
CPC ............ *G01M 5/0066* (2013.01); *H02G 1/02* (2013.01); *H02G 7/00* (2013.01)

(58) Field of Classification Search
USPC .......................................................... 73/579
See application file for complete search history.

(56) References Cited

U.S. PATENT DOCUMENTS

| | | | | |
|---|---|---|---|---|
| 2016/0209454 | A1* | 7/2016 | McCammon | G01R 1/07 |
| 2018/0062246 | A1* | 3/2018 | Hershey | H01Q 1/1242 |
| 2018/0375316 | A1* | 12/2018 | Greco | H02G 7/20 |
| 2020/0072814 | A1* | 3/2020 | Bailey | G01M 5/0066 |
| 2021/0172767 | A1 | 6/2021 | Yoda et al. | |
| 2021/0247214 | A1 | 8/2021 | Yoda et al. | |
| 2021/0247215 | A1 | 8/2021 | Yoda et al. | |
| 2021/0350337 | A1* | 11/2021 | Butera | G06Q 10/063 |
| 2022/0334165 | A1* | 10/2022 | Ding | G01H 9/004 |
| 2022/0397449 | A1* | 12/2022 | Iwano | G01D 5/35358 |

FOREIGN PATENT DOCUMENTS

| | | | | |
|---|---|---|---|---|
| JP | 2001-066117 | A | | 3/2001 |
| JP | 2007-183166 | A | | 7/2007 |
| JP | 2008067467 | A | * | 3/2008 |
| JP | 2013072800 | A | * | 4/2013 |
| JP | 2018096866 | A | * | 6/2018 |
| WO | WO-2007149668 | A2 | * | 12/2007 ............. H04L 12/66 |
| WO | 2020/044648 | A1 | | 3/2020 |
| WO | 2020/044655 | A1 | | 3/2020 |
| WO | 2020/044660 | A1 | | 3/2020 |

OTHER PUBLICATIONS

Translation_JP2018096866 (Year: 2018).*
JP Office Action for JP Application No. 2022-545251, mailed on Mar. 19, 2024 with English Translation.
Masuo Kado et al., "Long term continuous monitoring of structures by optical fiber sensors", Journal of Applied Mechanics vol. 6, Japan Society of Civil Engineers, Aug. 2003, pp. 1105-1112.
International Search Report for PCT Application No. PCT/JP2020/032866, mailed on Oct. 27, 2020.

* cited by examiner

| UTILITY POLE NUMBER | TYPE | DISTANCE FROM COMMUNICATION UNIT |
|---|---|---|
| 1 | A | 100 [m] |
| 2 | A | 120 [m] |
| 3 | B | 150 [m] |
| ⋮ | ⋮ | ⋮ |

| TYPE | VIBRATION WAVEFORM | DEGREE OF DETERIORATION OF UTILITY POLE |
|---|---|---|
| A | VIBRATION WAVEFORM a1 | NORMAL |
| A | VIBRATION WAVEFORM a2 | DEGREE OF DETERIORATION X |
| C | VIBRATION WAVEFORM c1 | DEGREE OF DETERIORATION X |
| ⋮ | ⋮ | ⋮ |

UTILITY POLE DETERIORATION DISCRIMINATION DEVICE AND METHOD

This application is a National Stage Entry of PCT/JP2020/032866 filed on Aug. 31, 2020, the contents of all of which are incorporated herein by reference, in their entirety.

TECHNICAL FIELD

The present disclosure relates to a deterioration discrimination system, a deterioration discrimination apparatus, and a deterioration discrimination method for discriminating deterioration of utility poles.

BACKGROUND ART

There is a method of diagnosing deterioration of utility poles by utilizing an optical fiber sensing technique. An example thereof is a method of tapping a utility pole to extract vibration components from the optical fiber cable laid in the utility pole and analyzing the extracted vibration components to thereby perform deterioration diagnosis of the utility pole. A technique of tapping a pole and analyzing the vibration components is disclosed in Patent Literature 1.

Utility poles have unique frequencies depending on the types of the utility poles. Therefore, deterioration diagnosis of a utility pole can be performed by analyzing the unique frequency specific to the type of the utility pole and the frequency generated when the utility pole is tapped.

CITATION LIST

Patent Literature

Patent Literature 1: International Patent Publication No. WO 2020/044648

SUMMARY OF INVENTION

Technical Problem

As described above, there is a method of performing deterioration diagnosis of a utility pole by tapping the utility pole. However, this method has a problem in that each utility pole to be diagnosed needs to be tapped by human hand, which incurs a high human resource cost.

An object of the present disclosure is to solve the aforementioned problem and provide a deterioration discrimination system, a deterioration discrimination apparatus, and a deterioration discrimination method that are adapted to perform deterioration diagnosis of utility poles while reducing the human resource cost.

Solution to Problem

According to an aspect of the present disclosure, a deterioration discrimination system includes:
 an optical fiber cable configured to be laid in a utility pole;
 a communication unit configured to receive an optical signal from optical fibers included in the optical fiber cable;
 a detection unit configured to detect, based on the optical signal received by the communication unit, vibrations that are generated in the utility pole; and
 a discrimination unit configured to discriminate, based on a vibration frequency of the vibrations that are generated during a specified period among the vibrations that are detected by the detection unit, deterioration of the utility pole.

According to an aspect of the present disclosure, a deterioration discrimination apparatus includes:
 a communication unit configured to receive an optical signal from optical fibers included in an optical fiber cable laid in a utility pole;
 a detection unit configured to detect, based on the optical signal received by the communication unit, vibrations that are generated in the utility pole; and
 a discrimination unit configured to discriminate, based on a vibration frequency of the vibrations that are generated during a specified period among the vibrations that are detected by the detection unit, deterioration of the utility pole.

According to an aspect of the present disclosure, a deterioration discrimination method for a deterioration discrimination apparatus, includes:
 a receiving step of receiving an optical signal from optical fibers included in an optical fiber cable laid in a utility pole;
 a detecting step of detecting, based on the optical signal received by the communication unit, vibrations that are generated in the utility pole; and
 a discriminating step of discriminating, based on a vibration frequency of the vibrations that are generated during a specified period among the vibrations that are detected in the detecting step, deterioration of the utility pole.

Advantageous Effects of Invention

According to the aforementioned aspects, an effect of providing a deterioration discrimination system, a deterioration discrimination apparatus, and a deterioration discrimination method that are adapted for performing deterioration diagnosis of utility poles while reducing the human resource cost can be provided.

EXAMPLE EMBODIMENT

Figures 1, 2:
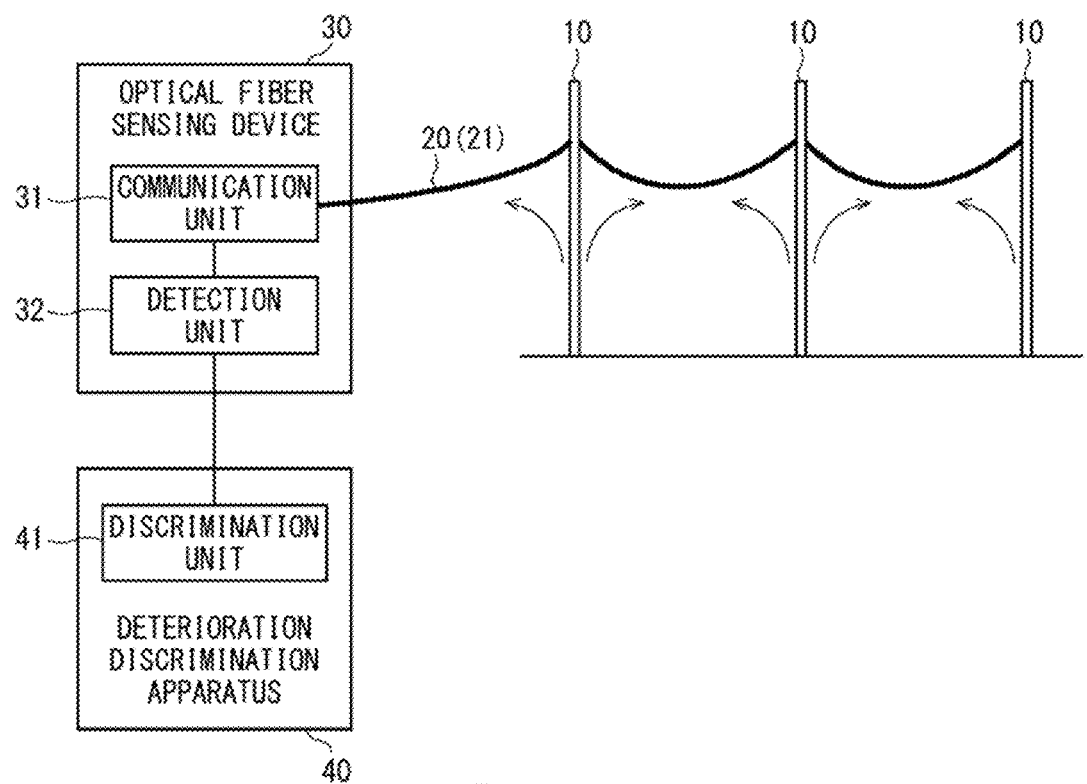
FIG. 1 is a diagram showing an example of a configuration of a deterioration discrimination system according to a first example embodiment.
FIG. 2 is a diagram showing an example of a correspondence table according to the first example embodiment.

Example embodiments of the present disclosure will be described below with reference to the drawings. Note that the following description and the attached drawings are appropriately shortened and simplified where appropriate for the sake of clarifying the explanation. Further, in the drawings, the identical reference symbols denote identical structural elements and the redundant explanations thereof are omitted.

First Example Embodiment

FIG. 1 shows an example of a configuration of a deterioration discrimination system according to a first example embodiment. Note that in FIG. 1, for the sake of simplifying the drawing, only three utility poles 10 are shown but the number of the utility poles 10 is not limited to three.

As shown in FIG. 1, the deterioration discrimination system according to the first example embodiment includes an optical fiber cable 20, an optical fiber sensing device 30, and a deterioration discrimination apparatus 40. Further, the optical fiber sensing device 30 includes a communication unit 31 and a detection unit 32, and the deterioration discrimination apparatus 40 includes a discrimination unit 41. The deterioration discrimination apparatus 40 can be located away from the optical fiber sensing device 30, for example on the cloud.

The optical fiber cable 20 is laid in the utility poles 10. The optical fiber cable 20 includes one or more optical fibers 21, and one end thereof is connected to the communication unit 31 provided inside the optical fiber sensing device 30.

The optical fibers 21 may be sensing-optical fibers or optical fibers for communication and sensing. Note that in the case where the optical fibers 21 are optical fibers for communication and sensing, optical signals for sensing are branched by an unillustrated filter at an early stage in the communication unit 31 so that only optical signals for sensing can be received by the communication unit 31.

The communication unit 31 makes a pulsed light incident on the optical fibers 21 included in the optical fiber cable 20 and receives a backscattering light that is generated due to the pulsed light being transmitted through the optical fibers 21 as an optical signal (an optical signal for sensing; the same hereinafter).

When a vibration occurs in the utility poles 10, the vibration of the utility poles 10 is transmitted to the optical fiber cable 20. As a result, the optical signal transmitted through the optical fibers 21 included in the optical fiber cable 20 change in its characteristics (e.g. wavelength).

Therefore, based on the optical signal which the communication unit 31 received from the optical fibers 21, the detection unit 32 can detect the vibration that has occurred at the respective poles 10.

Further, based on the time difference between the time at which the pulsed light was made incident on the optical fibers 21 by the communication unit 31 and the time at which the communication unit 31 received an optical signal from the optical fibers 21, the detection unit 32 can specify the location at which the optical signal was generated (a distance from the communication unit 31 to the optical fibers 21). Therefore, by checking the location at which the optical signal was generated against the correspondence table shown in FIG. 2, the detection unit 32 can specify at which utility pole 10 the optical signal was generated. In other words, when it is detected that a vibration has been generated at a utility pole 10, the detection unit 32 can specify at which utility pole 10 the vibration was generated. Note that in the correspondence table shown in FIG. 2, the utility pole numbers of the utility poles 10, the types of the utility poles 10, and the distance from the communication unit 31 to the optical fibers 21 are shown in correspondence with one another, but the types of the utility poles 10 may not necessarily be made to correspond. Further, the correspondence table shown in FIG. 2 may be pre-stored in an unillustrated memory or the like.

Here, the vibration waveform of the vibration generated at a utility pole 10 that is detected by the detection unit 32 is a vibration waveform unique to the utility pole 10 based on the type and the degree of deterioration of the utility pole 10. Here, based on the vibration of a utility pole 10 detected by the detection unit 32, the discrimination unit 41 discriminates the degree of deterioration of the utility pole 10.

Hereinbelow, a method of discriminating deterioration of the utility poles 10 by the discrimination unit 41 will be described in detail.

<Examining Vibration Waveforms of Utility Poles 10>

First, the inventors of the present disclosure examined the vibration waveforms of the utility poles 10. The result of the examination is described below.

First, the inventors of the present disclosure classified the utility poles 10 according to the respective degrees of deterioration of the utility poles into either one of the two labeling types shown below.

"Deteriorated":

Utility poles with vertical cracks, utility poles from which lime and rust are leaking "Normal":

Normal utility poles

In classification by labelings, a plurality of labelings other than "deteriorated" and "normal" may be used for classification based on the degree of deterioration of the utility poles.

Next, the inventors of the present disclosure performed, for each utility pole 10, observation of the vibration waveforms of the respective utility poles 10 that are obtained when they are tapped using a hammer.

Here, the inventors of the present disclosure observed a vibration waveform spectrum of a utility pole 10 obtained immediately after the utility pole 10 is tapped with a hammer.

Figure 3:
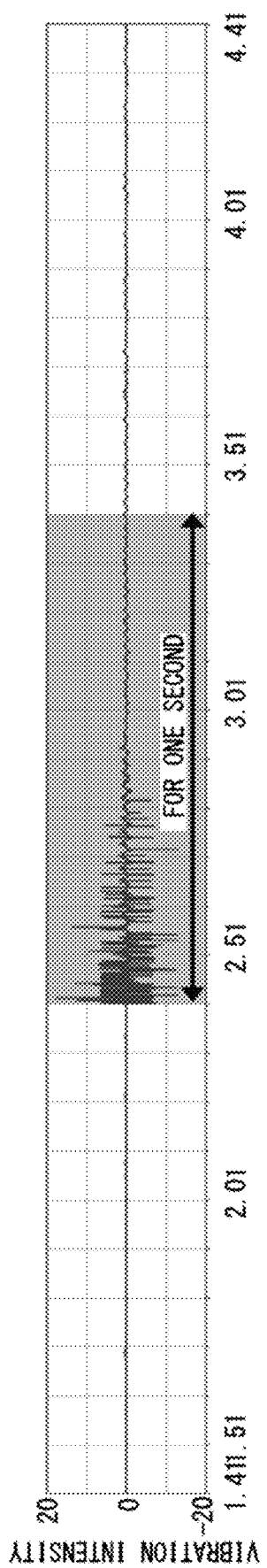
FIG. 3 is a diagram showing an example of a vibration waveform obtained when a utility pole is tapped with a hammer.

FIG. 3 shows an example of a vibration waveform of a utility pole 10 of type "A" labeled "normal", which is obtained when the utility pole 10 is tapped with a hammer. Note that in FIG. 3, the horizontal axis represents time and the vertical axis represents vibration intensity.

Figure 4:
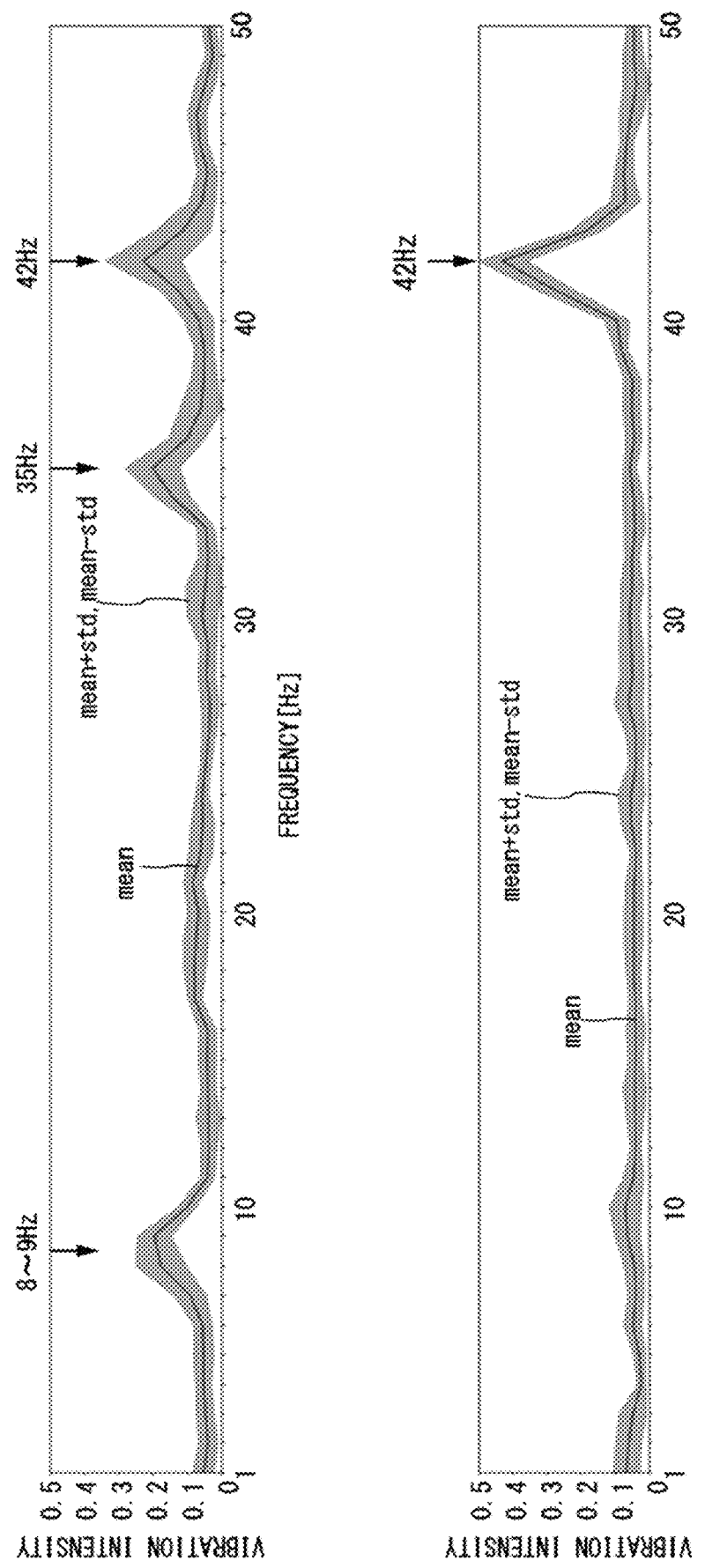
FIG. 4 is a diagram showing an example of a vibration waveform spectrum of a utility pole obtained when the utility pole is tapped with a hammer.
Figure 5:
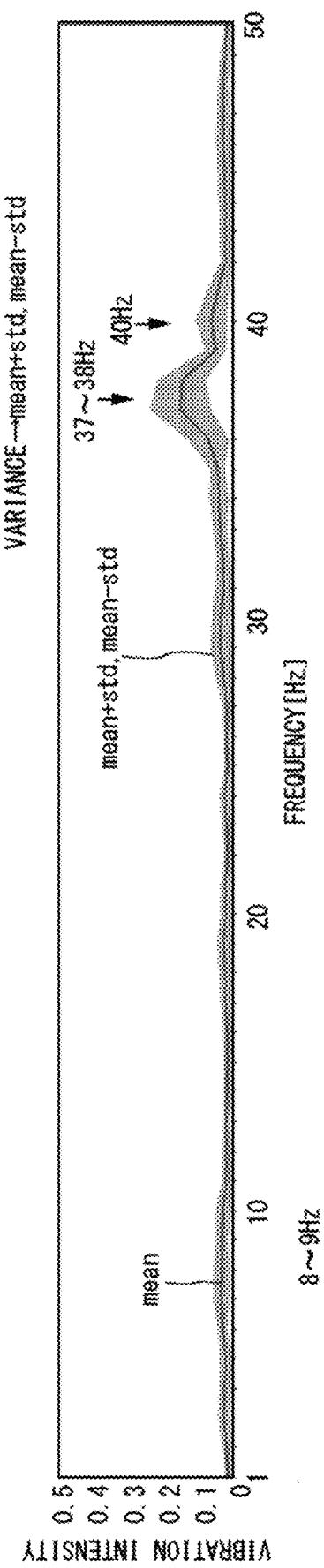
FIG. 5 is a diagram showing an example of a vibration waveform spectrum of a utility pole obtained when the utility pole is tapped with a hammer.
Figure 5:
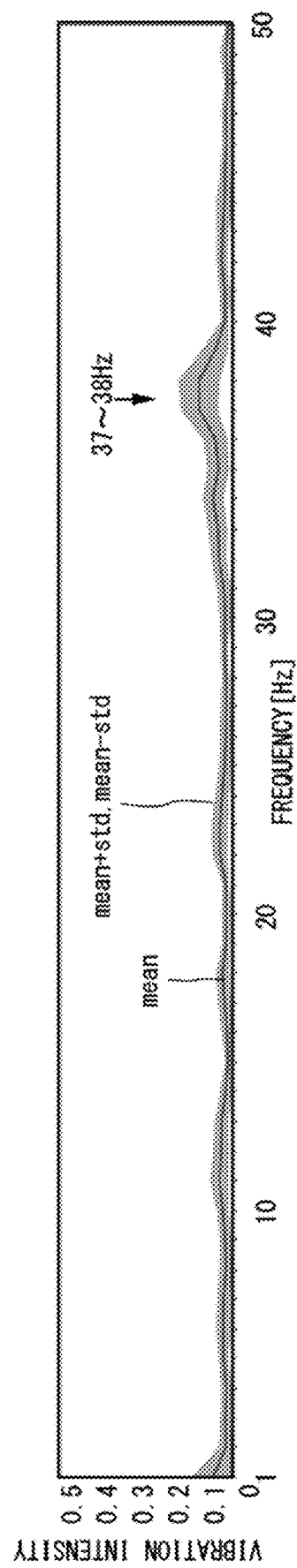
Figure 6:
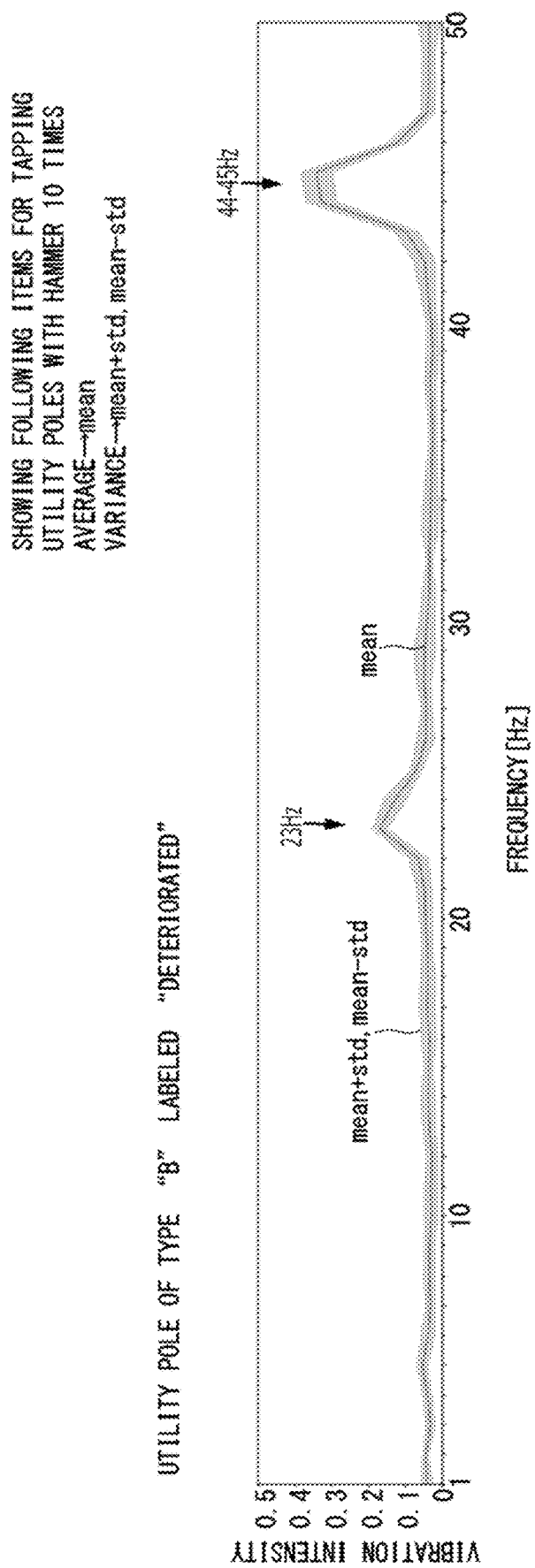
FIG. 6 is a diagram showing an example of a vibration waveform spectrum of a utility pole obtained when the utility pole is tapped with a hammer.

FIG. 4 shows an example of a vibration waveform spectrum of a utility pole 10 of type "A" labeled "normal", which is obtained immediately after the utility pole 10 is tapped with a hammer. Note that FIG. 4 shows respective vibration waveform spectra of two utility poles 10 of type "A" labeled "normal". Likewise, FIG. 5 shows an example of respective vibration waveform spectra of two utility poles 10 of type "A" labeled "deteriorated". Further, FIG. 6 shows an example of a vibration waveform spectrum of one utility pole 10 of type "B" labeled "deteriorated". Note that in FIGS. 4 to 6, the horizontal axis represents frequency and the vertical axis represents vibration intensity. Further, in FIGS. 4 to 6, the mean value and the variance value of the vibration intensity with respect to the respective frequencies are shown for the multiple number of times the respective poles are tapped with a hammer.

For example, comparing FIGS. 4 and 5, it can be understood that the vibration frequencies (hereinbelow referred to as the peak frequency) where the vibration intensity peaks differ even between the utility poles 10 of the same type "A" if the respective degrees of deterioration of the utility poles differ from each other. Specifically, for the utility pole 10 labeled "normal" shown in FIG. 4, the peak frequency is exhibited at 42 Hz. On the other hand, for the utility pole 10 labeled "deteriorated" shown in FIG. 5, the peak frequency is exhibited at 37 Hz to 38 Hz.

Further, comparing FIGS. 5 and 6, it can be understood that the peak frequencies differ even between the utility poles 10 that are both labeled "deteriorated" if the types of the utility poles 10 differ from each other. More specifically, for the utility pole 10 of type "A" shown in FIG. 5, the peak frequency is exhibited at 37 Hz to 38 Hz. On the other hand, for the utility pole 10 of type "B" shown in FIG. 6, the peak frequency is exhibited at 44 Hz to 45 Hz.

As described above, the inventors of the present disclosure confirmed that in vibration waveform spectra of utility poles 10 that are obtained when the respective utility poles 10 are tapped with a hammer, the peak frequencies differ among the utility poles 10 depending on the respective types of the utility poles 10 and further depending on the respective degrees of deterioration of the utility poles 10.

Next, the inventors of the present disclosure observed, for each utility pole 10, the vibration waveform of the utility pole 10 when the utility pole is vibrating naturally.

Figure 7:
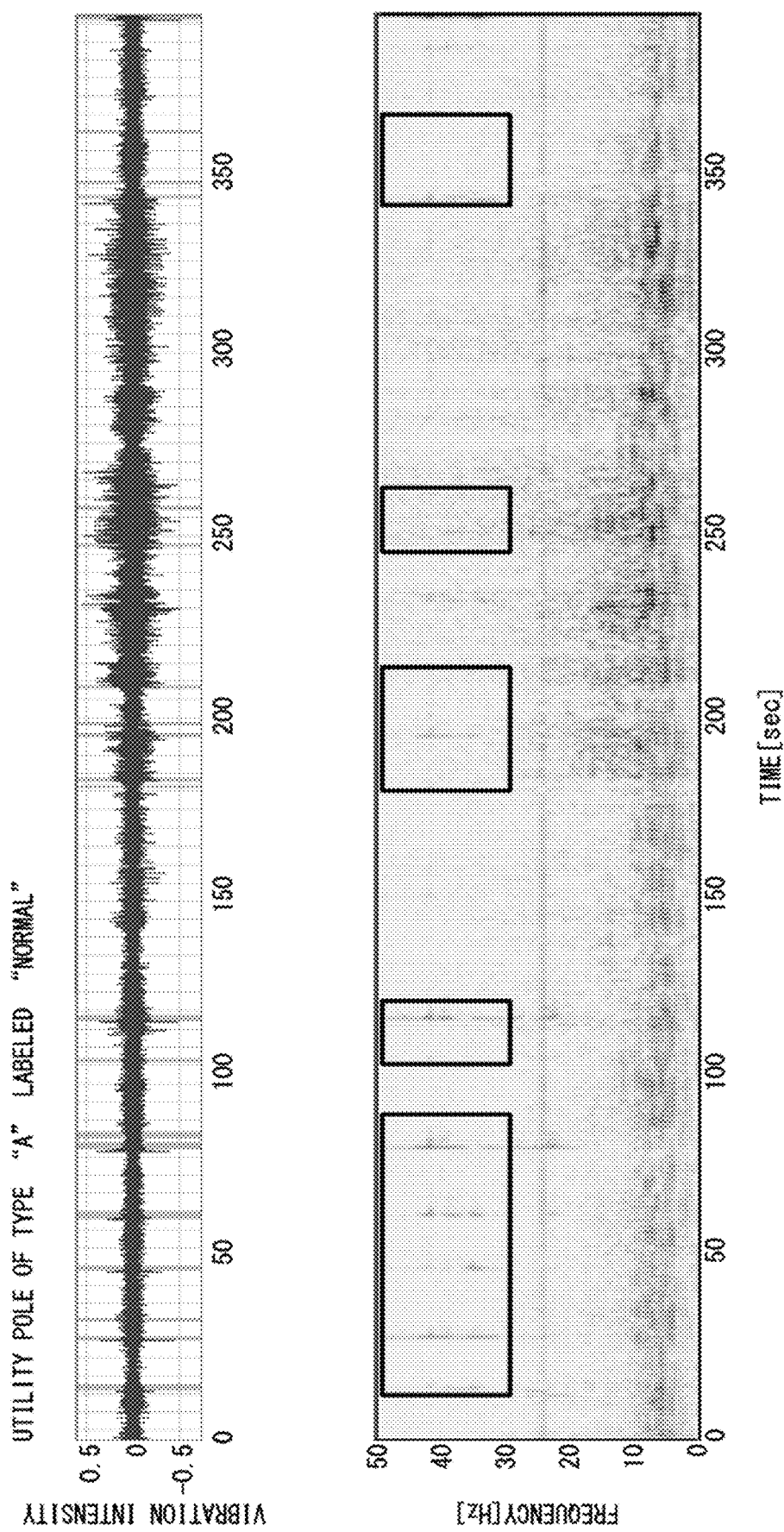
FIG. 7 is a diagram showing an example of a vibration waveform of a utility pole when the utility pole is vibrating naturally and a spectrogram of the vibration waveform.

FIG. 7 shows an example of a vibration waveform of a utility pole 10 of type "A" labeled "normal" and a spectrogram of the vibration waveform. Note that in FIG. 7, the upper drawing shows a vibration waveform and the lower drawing shows a spectrogram of the vibration waveform. Further, in the upper drawing of FIG. 7, the horizontal axis represents time and the vertical axis represents vibration intensity. Further, in the bottom diagram of FIG. 7, the horizontal axis represents time and the vertical axis represents frequency. Likewise, FIG. 8 shows an example of a vibration waveform of a utility pole 10 of type "A" labeled "deteriorated" and a spectrogram of the vibration waveform.

Figure 8:
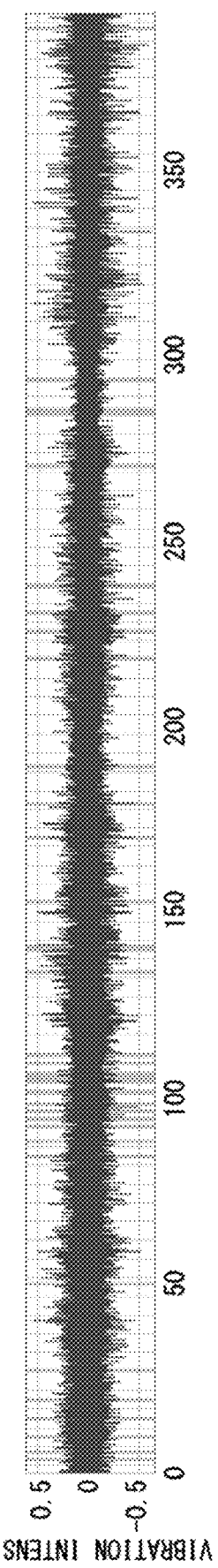
FIG. 8 is a diagram showing an example of a vibration waveform of a utility pole when the utility pole is vibrating naturally and a spectrogram of the vibration waveform.
Figure 8:
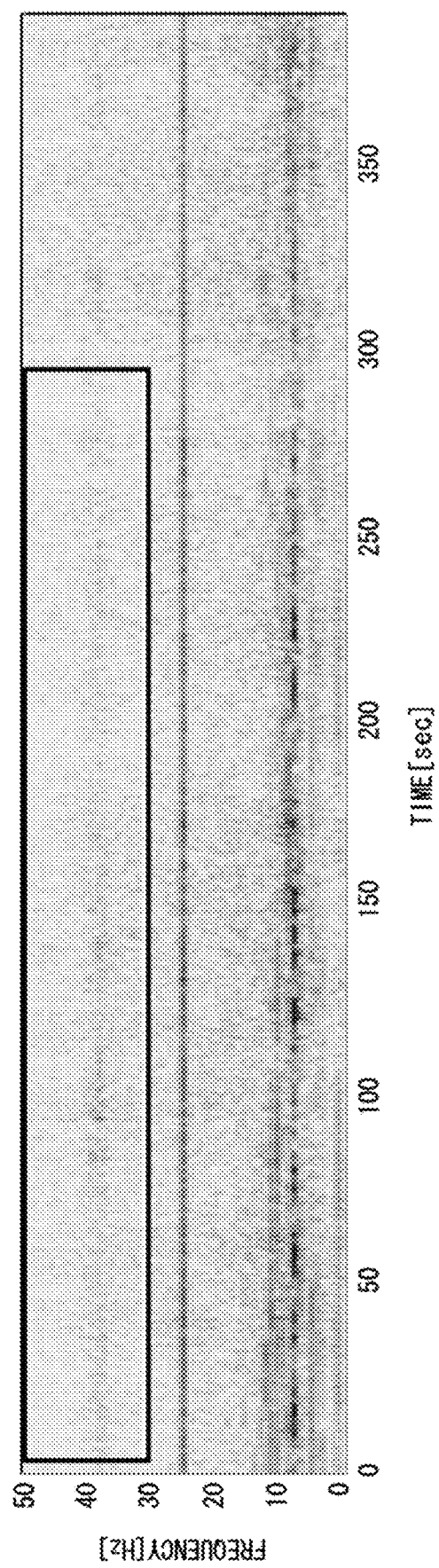

As shown in FIGS. 7 and 8, it can be understood that in the respective spectrograms of the vibration waveforms of the utility poles 10, overall, high vibration frequency components of around 30 Hz to 50 Hz are exhibited every now and then. The parts surrounded by the solid lines on the spectrogram of the vibration waveforms shown in FIGS. 7 and 8 correspond to the aforementioned high vibration frequency components.

Therefore, the inventors of the present disclosure performed, for each utility pole 10, the following processes at intervals of one second using a vibration waveform of the utility pole 10 obtained when the utility pole is vibrating naturally and a spectrogram of the vibration waveform. Note that the parts of the vibration waveforms shown in FIGS. 7 and 8 that are lightly colored correspond to the time periods during which the peak frequencies could be extracted.

A vibration frequency in which an amplitude intensity that is equal to or greater than three times the mean amplitude intensity is exhibited and which falls within the range of 30 Hz to 50 Hz is extracted as the peak frequency.

FIGS. 9A to 9D each shows an example of aggregate results of the number of times a peak frequency is extracted for each of four utility poles 10 when each utility pole 10 is vibrating naturally. Note that each of FIGS. 9A to 9D shows the label of the utility pole 10, the pole number of the utility pole 10, the number of times each frequency was extracted as the peak frequency, the frequency most frequently extracted as the peak frequency, and the peak frequency obtained when the utility pole is tapped with a hammer.

Figure 9A:
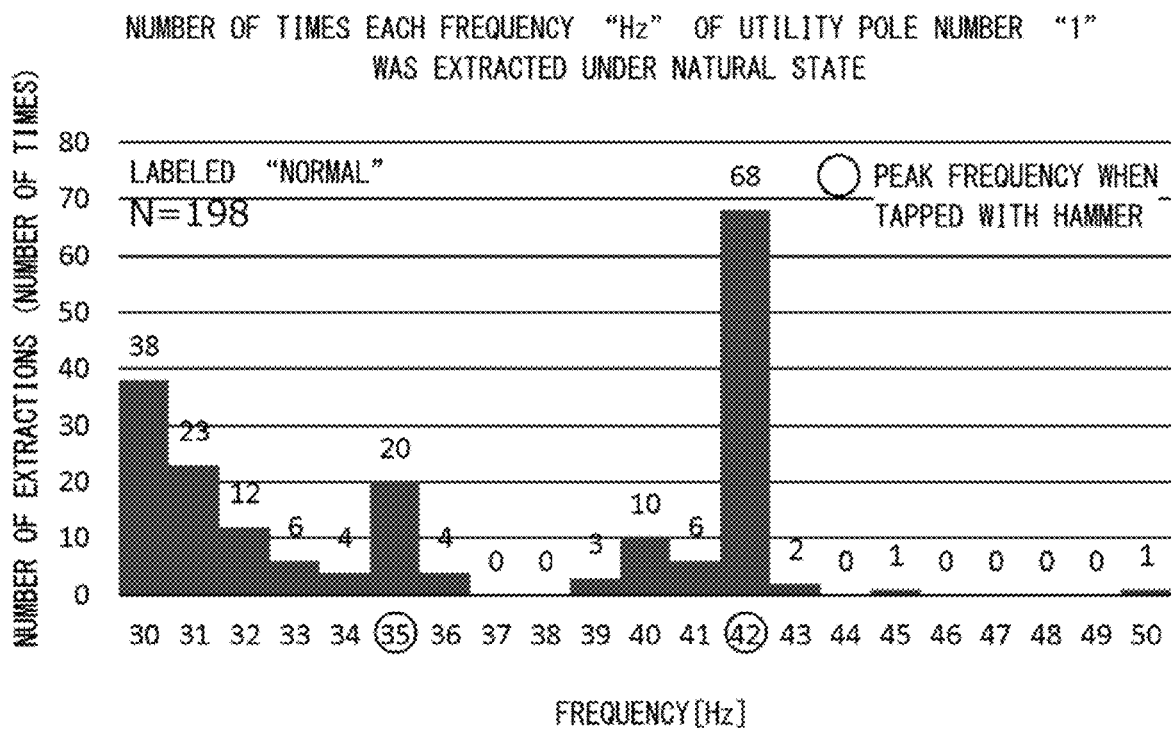
FIG. 9A is a diagram showing an example of aggregate results of the number of times a peak frequency is extracted when a utility pole is vibrating naturally.
Figure 9B:
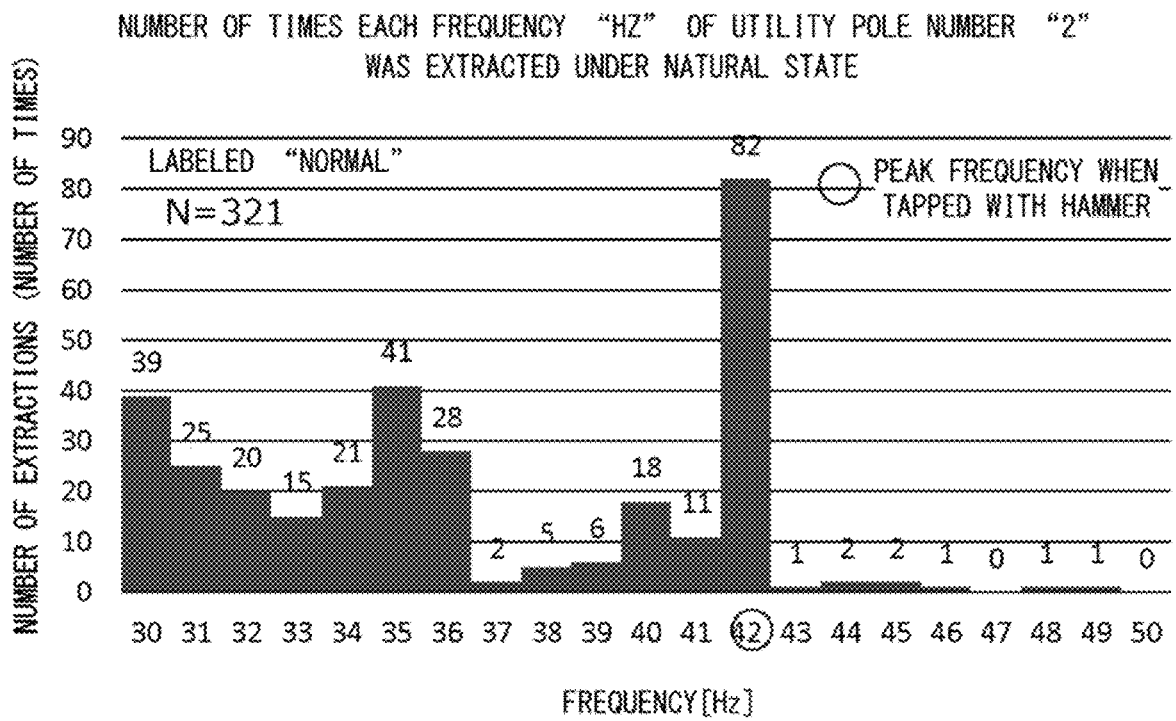
FIG. 9B is a diagram showing an example of aggregate results of the number of times a peak frequency is extracted when a utility pole is vibrating naturally.
Figure 9C:
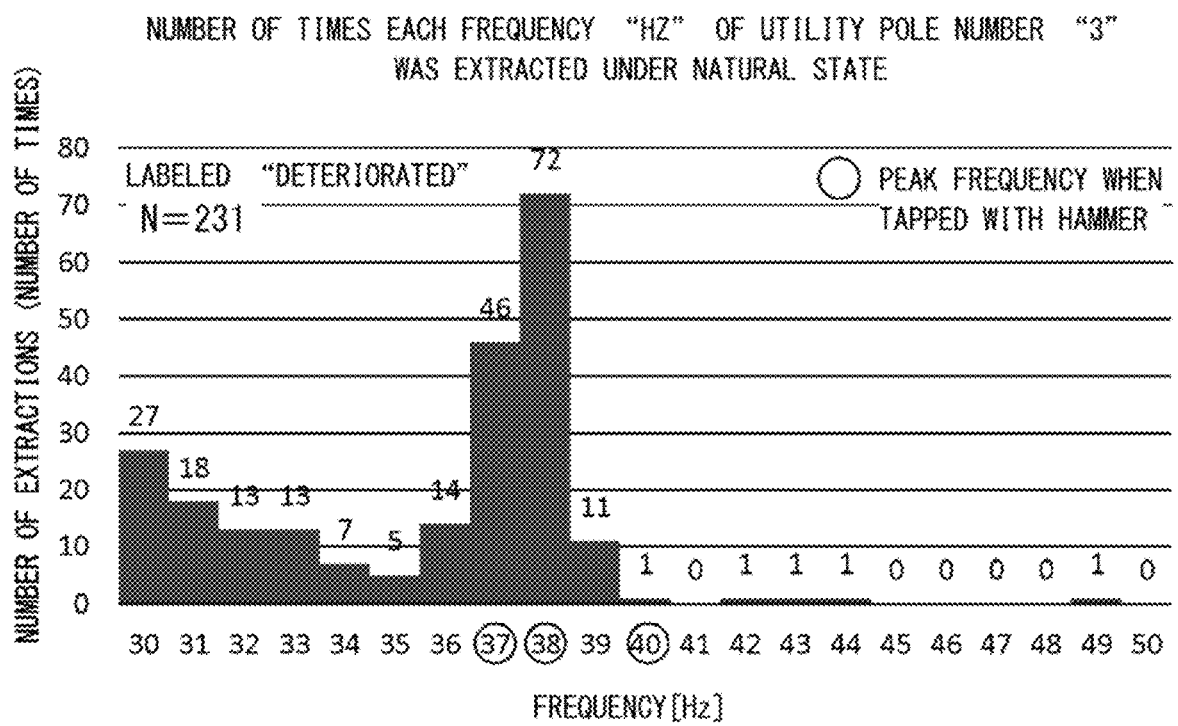
FIG. 9C is a diagram showing an example of aggregate results of the number of times a peak frequency is extracted when a utility pole is vibrating naturally.
Figure 9D:
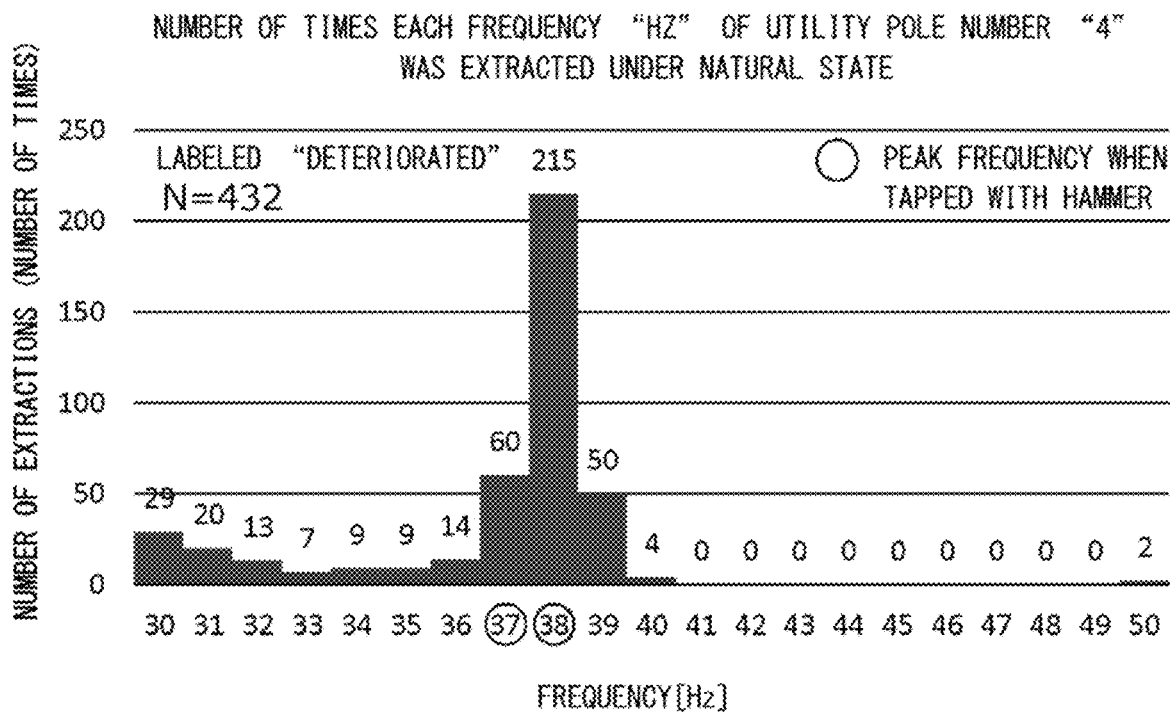
FIG. 9D is a diagram showing an example of aggregate results of the number of times a peak frequency is extracted when a utility pole is vibrating naturally.

As shown in FIG. 9A, for example, when the utility pole 10 of pole number "1" is vibrating naturally, the frequency most frequently extracted as the peak frequency is 42 Hz; it is extracted 68 times. Further, in the peak frequency of the utility pole 10 of pole number "1", the peak frequencies obtained when the utility pole is tapped with a hammer are 8 Hz, 9 Hz, 35 Hz, and 42 Hz.

That is, in the utility pole 10 of pole number "1", the frequency most frequently extracted as the peak frequency is 42 Hz when the utility pole is vibrating naturally, which matches one of the peak frequencies, 42 Hz, among the peak frequencies obtained when the utility pole is tapped with a hammer. A similar tendency was confirmed for the utility poles 10 of other pole numbers.

As described above, the inventors of the present disclosure confirmed that there is a tendency for a frequency extracted a high number of times as the peak frequency when a utility pole 10 is vibrating naturally to match the peak frequency when the utility pole 10 is tapped with a hammer.

<Method of Discriminating Deterioration of Utility Pole 10>

As described above, there is a tendency for a frequency extracted a high number of times as the peak frequency when a utility pole 10 is vibrating naturally to match the peak frequency when the utility pole 10 is tapped with a hammer.

Therefore, it is possible to discriminate deterioration of a utility pole 10 using, for example, the vibration waveform of the vibration of the utility pole 10 when the utility pole 10 is vibrating naturally without having to generate an artificial vibration by tapping the utility pole 10 with a hammer.

Here, the discrimination unit 41 discriminates deterioration of a utility pole 10 based on the vibration frequency of the vibrations of the utility pole 10 that are generated during a specified period among the vibrations detected by the detection unit 32. The specified period includes a period during which the vibration intensity of the vibration of a utility pole 10 is equal to or greater than a predetermined value. The predetermined value of the vibration intensity may be equal to or greater than three times the mean value of an amplitude intensity, but it is not limited thereto.

To be more specific, each time the vibration intensity of the vibration of a utility pole 10 detected by the detection unit 32 reaches a value equal to or greater than a predetermined value within a specified period, the discrimination unit 41 extracts the vibration frequency that is obtained when the vibration intensity reaches a value equal to or greater than the predetermined value and discriminates deterioration of the utility pole 10 based on a vibration frequency extracted a high number of times. To be more specific, each time the vibration intensity of the vibration of a utility pole 10 detected by the detection unit 32 reaches a value equal to or greater than a predetermined value within a specified period, the discrimination unit 41 extracts the vibration frequency that is obtained when the vibration intensity reaches a value equal to or greater than the predetermined value and falls within the predetermined frequency range and discriminates deterioration of the utility pole 10 based on the vibration frequency extracted a high number of times. The predetermined frequency range is a frequency range of a frequency equal to the peak frequency obtained a utility pole 10 is tapped, for example, within a range of around 30 Hz to 50 Hz as described in the above example.

At this time, the discrimination unit 41 may use a trained model that has been trained using training data that differs according to the type of a utility pole 10 and discriminates deterioration of the utility pole 10. The trained model is, for example, a training model trained by a CNN (Convolutional Neural Network) and may be pre-stored in an unillustrated memory or the like.

Figures 10, 11:
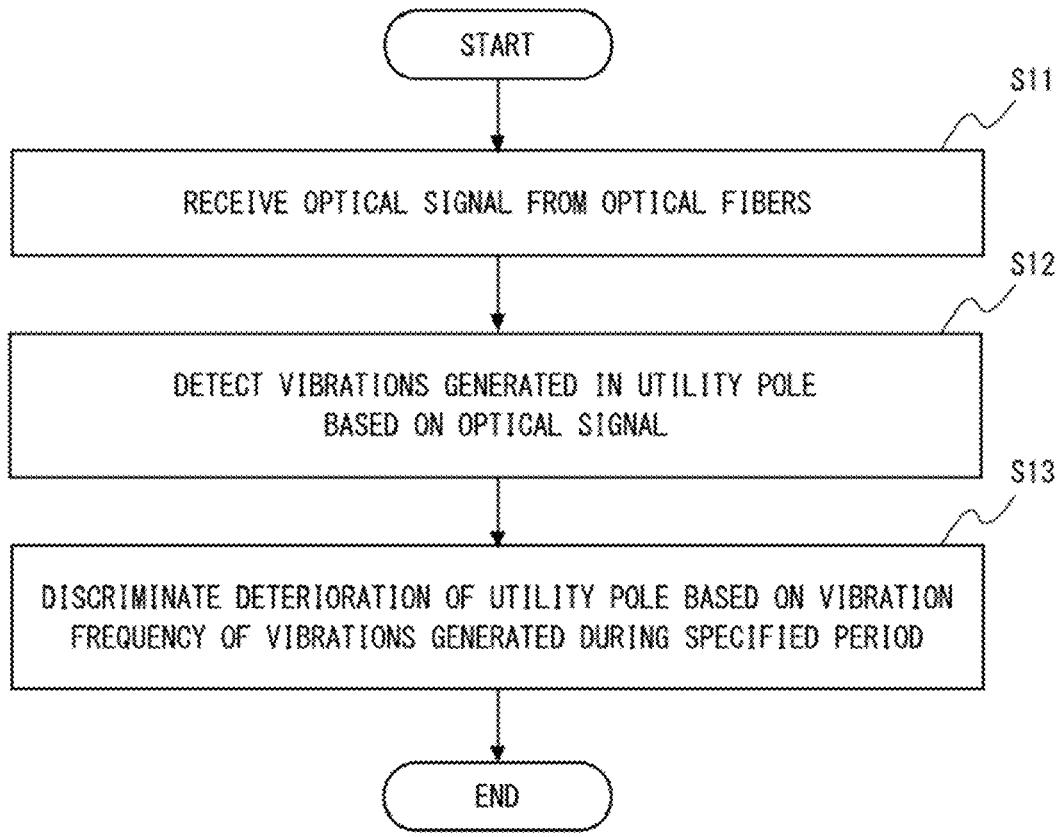
FIG. 10 is a diagram showing an example of training data according to the first example embodiment.
FIG. 11 is a flowchart showing an example of operation flow of a deterioration discrimination system according to the first example embodiment.

FIG. 10 is a diagram showing an example of training data used for training a learning model. The training data shown in FIG. 10 consists of a combination of the type of each utility pole 10, the vibration waveform of each utility pole 10, and the deterioration state of each utility pole 10.

In the case of using the aforementioned learning model, the discrimination unit 41 inputs the combination of the type of the utility pole 10 and the vibration waveform of the utility pole 10 in the learning model. Note that by pre-storing a correspondence table like the one shown in Table 2 in an unillustrated memory or the like, the type of the utility pole 10 may be read-out from the stored correspondence table. The discrimination unit 41 can obtain the state of deterioration of the utility pole 10 as an output result of the learning model for the aforementioned input.

Note that in the example shown in FIG. 10, the training data consists of a combination of the type of each utility pole 10, the vibration waveform of each utility pole 10, and the deterioration state of each utility pole 10, but it is not limited thereto. The discrimination unit 41 may derive, based on the vibration waveform of a utility pole 10, the vibration frequency extracted a high number of times as the peak frequency and use the derived vibration frequency as the training data in place of the frequency waveform of the utility pole 10.

Next, an operation of the deterioration discrimination system according to the first example embodiment will be described with reference to FIG. 11.

As shown in FIG. 11, the communication unit 31 receives an optical signal from the optical fibers 21 included in the optical fiber cable 20 (Step S11).

Next, the detection unit 32 detects the vibrations generated in the utility pole 10 based on the optical signal received by the communication unit 31 (Step S12).

Then, the discrimination unit 41 discriminates deterioration of the utility pole 10 based on the vibration frequency of the vibrations that are generated during a specified period among the vibrations detected by the detection unit 32 (Step S13).

As described above, according to the first example embodiment, the communication unit 31 receives an optical signal from the optical fibers 21. The detection unit 32 detects vibrations that are generated in the utility pole 10 based on the optical signal received from the communication unit 31. The discrimination unit 41 discriminates deterioration of the utility pole 10 based on the vibration frequency of the vibrations that are generated during a specified period among the vibrations detected by the detection unit 32.

Therefore, it is possible to discriminate deterioration of a utility pole 10 without having to generate an artificial vibration by tapping the utility pole 10 with a hammer. By this configuration, perform deterioration diagnosis of utility poles 10 while reducing the human resource cost.

Second Example Embodiment

Figure 12:
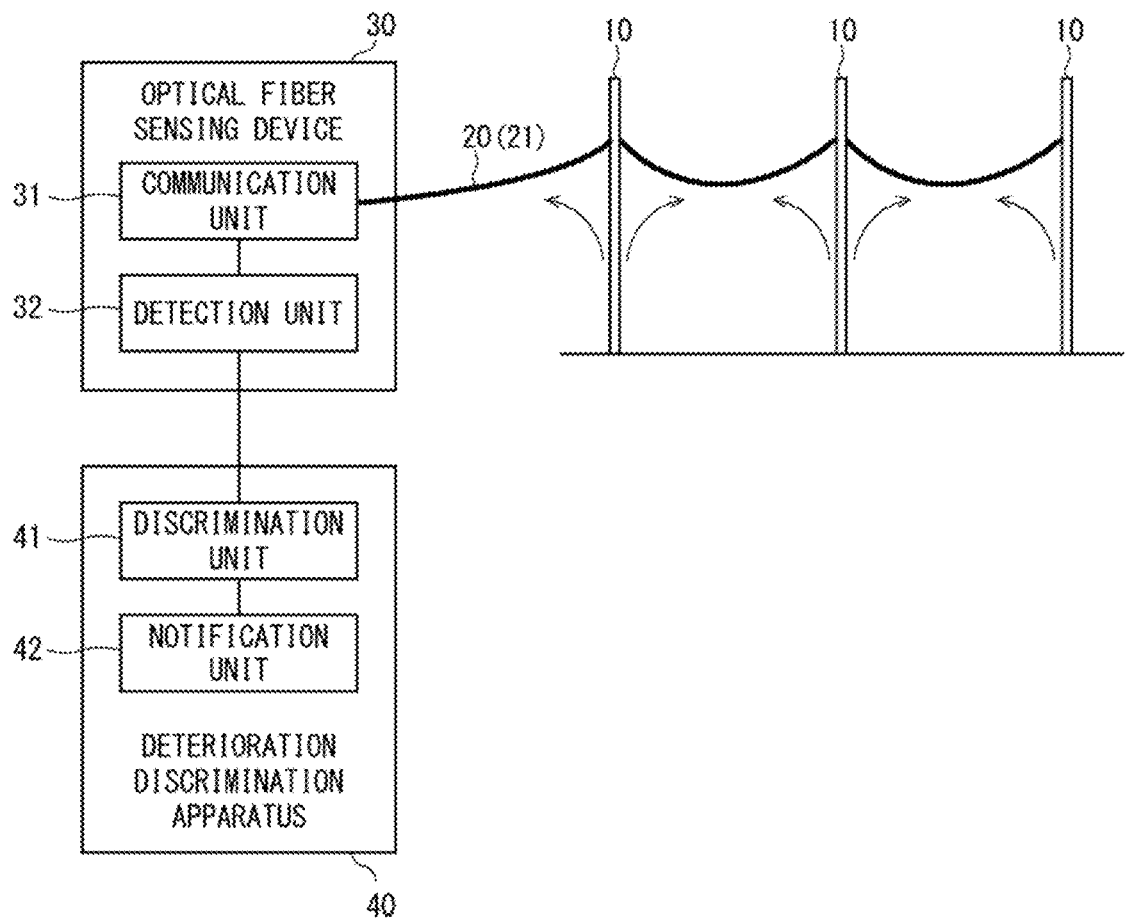
FIG. 12 is a diagram showing an example of a configuration of a deterioration discrimination system according to a second example embodiment.

Next, an example of a configuration of a deterioration discrimination system according to a second example embodiment with reference to FIG. 12.

As shown in FIG. 12, the deterioration discrimination system according to the second example embodiment differs in configuration from the deterioration discrimination apparatus shown in FIG. 1 of the first example embodiment described above in that a notification unit 42 is added inside the deterioration discrimination apparatus 40.

The notification unit 42 notifies the predetermined notification destination of the state of deterioration of the utility pole 10 discriminated by the discrimination unit 41. The predetermined notification destination may be a terminal held by an inspector who monitors utility poles 10, a terminal installed at a monitoring center, or the like. Further, a method of notification may be a method of displaying a GUI (Graphical User Interface) screen on a display, a monitor, or the like of a terminal which is at the notification destination, or a method of performing audio output of a message from the terminal which is at the notification destination. Further, the notification unit 42 may perform notification of the state of deterioration of a utility pole 10 in the case where the degree of the utility pole 10 is equal to or greater than the utility pole 10.

Next, a flow of the operation of the deterioration discrimination system according to this second example embodiment will be described with reference to FIG. 13.

Figure 13:
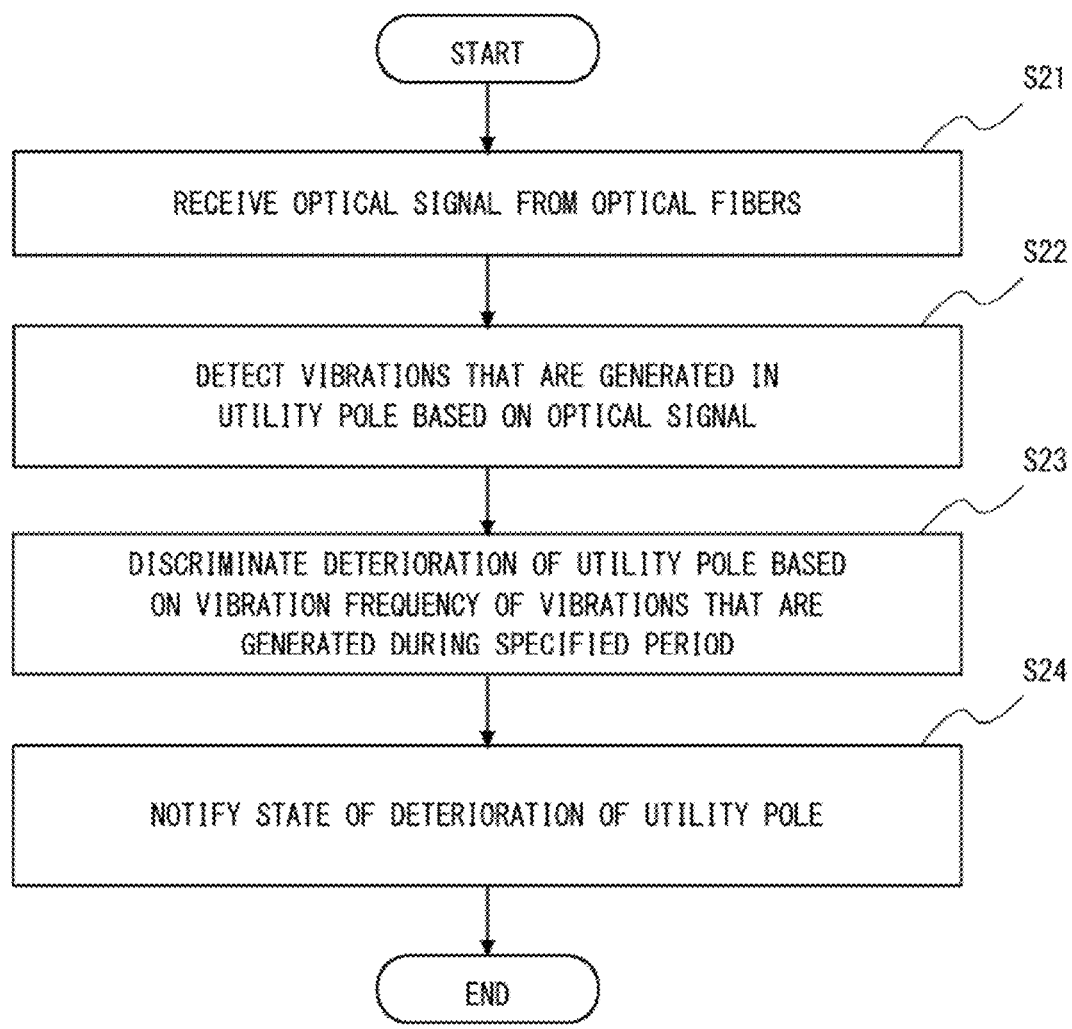
FIG. 13 is a flowchart showing an example of operation flow of the deterioration discrimination system according to the second example embodiment.

As shown in FIG. 13, first, processings of Steps S21 to S23 that are the same as the aforementioned processings of Steps S11 to S13 shown in FIG. 11 of the first example embodiment are performed.

Then, the notification unit 42 notifies the predetermined notification destination of the state of deterioration of the utility pole 10 discriminated by the discrimination unit 41 (Step S24).

As described above, according to the second example embodiment, the notification unit 42 notifies the predetermined destination of the state of deterioration of the utility pole 10 for discriminated by the discrimination unit 41. By this configuration, the state of deterioration of the utility pole 10 can be reported to the monitoring staff or the monitoring center who monitors the utility pole 10.

Other effects are the same as the aforementioned first example embodiment.

Other Example Embodiment

Figure 14:
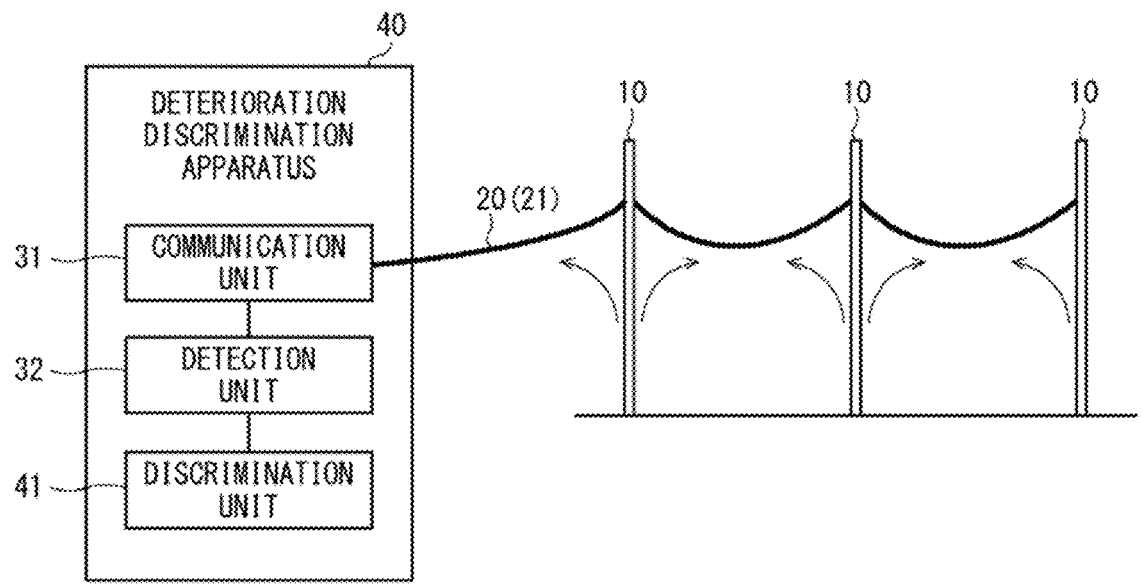
FIG. 14 is a diagram showing an example of a configuration of a deterioration discrimination system according to another example embodiment.

In the aforementioned example embodiment, the communication unit 31 and the detection unit 32 are separated from the deterioration discrimination apparatus 40, however it is not limited to this configuration. The communication unit 31 and the detection unit 32 may be provided inside the deterioration discrimination apparatus 40. FIG. 14 shows an example of a configuration of the deterioration discrimination apparatus 40 inside which the communication unit 31 and the detection unit 32 are provided. Note that the deterioration discrimination system shown in FIG. 14 may have the notification unit 42 added inside the deterioration discrimination apparatus 40 like in the aforementioned configuration of the second example embodiment.

Further, in the aforementioned example embodiment, one communication unit 31 and one detection unit 32 are provided, but the numbers are not limited thereto. For example, when a plurality of optical fibers 21 are disposed, a plurality of communication units 31 and a plurality of detection units 32 may be provided, each corresponding to the plurality of optical fibers 21. Further, a plurality of the deterioration units 41 may be provided each corresponding to the plurality of optical fibers 21.

Figure 15:
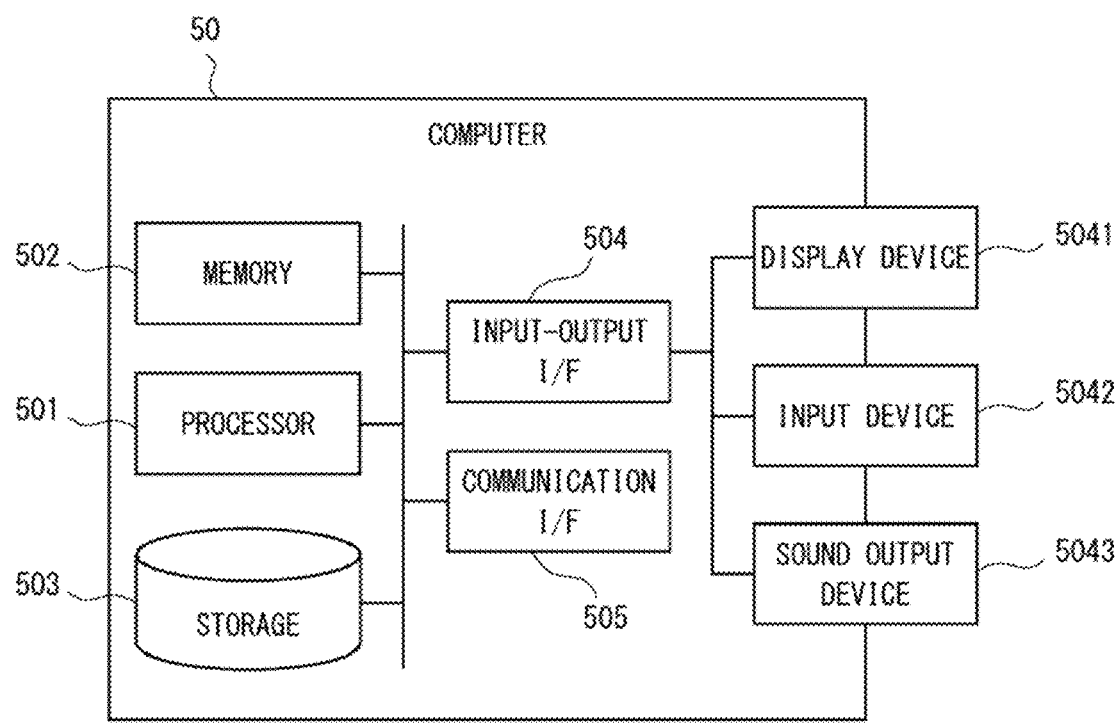
FIG. 15 is a block diagram showing an example of a hardware configuration of a computer that implements a deterioration discrimination apparatus according to an example embodiment.

Hardware Configuration of Deterioration Discrimination Apparatus According to Example Embodiment FIG. 15 is an example of a hardware configuration of a computer 50 that implements the deterioration discrimination apparatus 40 according to the aforementioned example embodiment.

As shown in FIG. 15, the computer 50 includes a processor 501, a memory 502, a storage 503, an input-output interface (an input-output I/F) 504, a communication interface (communication I/F) 505, and etc. The processor 501, the memory 502, the storage 503, the input-output interface 504, and the communication interface 505 are connected with one another through a data transmission channel for transmitting and receiving data.

The processor 501 is a processor controller such as a CPU (Central Processing Unit) and GPU (Graphics Processing Unit). The memory 502 is a memory such as a RAM (Random Access Memory), a ROM (Read Only Memory), or the like. The storage 503 is a storage device such as a HDD (Hard Disk Drive), a SSD (Solid State Drive), and a memory card. Further, the storage 503 may be a memory such as RAM, a ROM, etc.

The storage 503 stores a program that implements the functions of the structural elements provided in the deterioration discrimination apparatus 40. The processor 501 implements the functions of the structural elements provided in the deterioration discrimination apparatus 40 by executing the aforementioned programs. Here, when executing each of the aforementioned programs, the processor 501 may read out these programs from the memory 502 and then execute them or may execute these programs without reading out these programs from the memory 502. Further, the memory 502 and the storage 503 may also serve to store information and data held by the structural elements provided to the deterioration discrimination apparatus 40.

The aforementioned program can be stored by using any of various types of non-transitory computer readable media and supplied to a computer (including the computer 50). Non-transitory computer-readable media include various types of tangible storage media. Examples of non-transitory computer-readable media include magnetic storage media (e.g. flexible disks, magnetic tapes, and hard disk drives), magneto-optical storage media (e.g., magneto-optical disks), CD-ROM (Compact Disc-ROM), CD-R (CD-Recordable), and CD-R/W (CD-ReWritable), semiconductor memory (e.g. mask ROM, PROM (Programmable ROM), EPROM (Erasable PROM), flash ROM, and RAM. Further, the program may also be supplied to a computer through any of various types of transitory computer-readable media. Examples of the transitory computer-readable media include electrical signals, optical signals, and electromagnetic waves. The transitory computer-readable media can supply the program to a computer via a wired communication path, such as electric wires and optical fibers, or a wireless communication path.

The input-output interface 504 is connected to a display device 5041, an input device 5042, and a sound output device 5043, etc. The display device 5041 is a device such as a LCD (Liquid Crystal Display), a CRT (Cathode Ray Tube) display, or a monitor for displaying a screen corresponding to a graphic data to be processed by the processor 501. The input device 5042 is a device for accepting an input operation performed by an operator, and an example thereof includes a keyboard, a mouse, and a touch sensor. The display device 5041 and the input device 5042 are configured integrally and may be realized as a touch panel. The sound output device 5043 is a device such as a speaker that outputs sound corresponding to the acoustic data processed by the processor 501.

The communication interface 505 performs transmission and reception of data between external devices. For example, the communication interface 505 performs communication with external devices through cables or wirelessly.

While the present disclosure has been described above with reference to the example embodiments, the present disclosure is not limited to the example embodiments described above. Various changes that can be understood by those skilled in the art can be made to the configuration and details of the present disclosure within the scope of the present invention. For example, some or all of the aforementioned example embodiments can be applied in combination.

Further, some or all of the above example embodiments may also be described as in the following Supplementary Notes, but should not be limited to the following.

Supplementary Note 1

A deterioration discrimination system comprising:
an optical fiber cable configured to be laid in a utility pole;
a communication unit configured to receive an optical signal from optical fibers included in the optical fiber cable;
a detection unit configured to detect, based on the optical signal received by the communication unit, vibrations that are generated in the utility pole; and
a discrimination unit configured to discriminate, based on a vibration frequency of the vibrations that are generated during a specified period among the vibrations that are detected by the detection unit, deterioration of the utility pole.

Supplementary Note 2

The deterioration discrimination system described in Supplementary Note 1, wherein the specified period includes a period during which vibration intensity of the vibrations detected by the detection unit reaches a value equal to or greater than a predetermined value, and each time the vibration intensity of the vibrations detected by the detection unit reaches the value equal to or greater than the predetermined value within the specified period, the discrimination unit extracts the vibration frequency that is obtained when the vibration intensity reaches the value equal to or greater than the predetermined value and discriminates deterioration of the utility pole based on the vibration frequency extracted a high number of times.

Supplementary Note 3

The deterioration discrimination system described in Supplementary Note 2, wherein each time the vibration intensity of the vibrations detected by the detection unit reaches the value equal to or greater than the predetermined value within the specified period, the discrimination unit extracts the vibration frequency that is obtained when the vibration intensity reaches the value equal to or greater than the predetermined value and falls within the predetermined frequency range and discriminates deterioration of the utility pole based on the vibration frequency extracted a high number of times.

Supplementary Note 4

The deterioration discrimination system described in any one of Supplementary Notes 1 to 3, wherein the discrimination unit discriminates deterioration of the utility pole using a trained model that has been trained using a training data that differs according to a type of the utility model.

Supplementary Note 5

The deterioration discrimination system described in any one of Supplementary Notes 1 to 4, further comprising a notification unit configured to notify a predetermined notification destination of a state of deterioration of the utility pole discriminated by the discrimination unit.

Supplementary Note 6

A deterioration discrimination apparatus comprising:
a communication unit configured to receive an optical signal from optical fibers included in an optical fiber cable laid in a utility pole;
a detection unit configured to detect, based on the optical signal received by the communication unit, vibrations that are generated in the utility pole; and
a discrimination unit configured to discriminate, based on a vibration frequency of the vibrations that are generated during a specified period among the vibrations that are detected by the detection unit, deterioration of the utility pole.

Supplementary Note 7

The deterioration discrimination apparatus described in Supplementary Note 6, wherein
the specified period includes a period during which vibration intensity of the vibrations detected by the detection unit reaches a value equal to or greater than a predetermined value, and
each time the vibration intensity of the vibrations detected by the detection unit reaches the value equal to or greater than the predetermined value within the specified period, the discrimination unit extracts the vibration frequency that is obtained when the vibration intensity reaches the value equal to or greater than the predetermined value and discriminates deterioration of the utility pole based on the vibration frequency extracted a high number of times.

Supplementary Note 8

The deterioration discrimination apparatus described in Supplementary Note 7, wherein each time the vibration intensity of the vibrations detected by the detection unit reaches the value equal to or greater than the predetermined value within the specified period, the discrimination unit extracts the vibration frequency that is obtained when the vibration intensity reaches the value equal to or greater than the predetermined value and falls within the predetermined frequency range and discriminates deterioration of the utility pole based on the vibration frequency extracted a high number of times.

Supplementary Note 9

The deterioration discrimination apparatus described in any one of Supplementary Notes 6 to 8, wherein the discrimination unit discriminates deterioration of the utility pole using a trained model that has been trained using a training data that differs according to a type of the utility model.

Supplementary Note 10

The deterioration discrimination apparatus described in any one of Supplementary Notes 6 to 9, further comprising a notification unit configured to notify a predetermined notification destination of a state of deterioration of the utility pole discriminated by the discrimination unit.

Supplementary Note 11

A deterioration discrimination method for a deterioration discrimination apparatus, comprising:
a receiving step of receiving an optical signal from optical fibers included in an optical fiber cable laid in a utility pole;
a detecting step of detecting, based on the optical signal received in the receiving step, vibrations that are generated in the utility pole; and
a discriminating step of discriminating, based on a vibration frequency of the vibrations that are generated during a specified period among the vibrations that are detected in the detecting step, deterioration of the utility pole.

Supplementary Note 12

The deterioration discrimination method described in Supplementary Note 11, wherein
the specified period includes a period during which vibration intensity of the vibrations detected in the detecting step reaches a value equal to or greater than a predetermined value, and
in the discriminating step, each time the vibration intensity of the vibrations detected in the detecting step reaches the value equal to or greater than the predetermined value within the specified period, the vibration frequency that is obtained when the vibration intensity reaches the value equal to or greater than the predetermined value is extracted and deterioration of the utility pole is discriminated based on the vibration frequency extracted a high number of times.

Supplementary Note 13

The deterioration discrimination method described in Supplementary Note 12, wherein in the discriminating step, each time the vibration intensity of the vibrations detected in the detecting step reaches the value equal to or greater than the predetermined value within the specified period, the vibration frequency that is obtained when the vibration intensity reaches the value equal to or greater than the predetermined value and falls within the predetermined frequency range is obtained and deterioration of the utility pole is discriminated based on the vibration frequency extracted a high number of times.

Supplementary Note 14

The deterioration discrimination method described in any one of Supplementary Notes 11 to 13, wherein in the discriminating step, discrimination of the deterioration of the utility pole is performed using a trained model that has been trained using a training data that differs according to a type of the utility model.

Supplementary Note 15

The deterioration discrimination method described in any one of Supplementary Notes 11 to 14, further comprising a notifying step of notifying a predetermined notification destination of a state of deterioration of the utility pole discriminated in the discriminating step.

REFERENCE SIGNS LIST

10 UTILITY POLE
20 OPTICAL FIBER CABLE
21 OPTICAL FIBER
30 OPTICAL FIBER SENSING DEVICE
31 COMMUNICATION UNIT
32 DETECTION UNIT
40 DETERIORATION DISCRIMINATION APPARATUS
41 DISCRIMINATION UNIT
42 NOTIFICATION UNIT
50 COMPUTER
501 PROCESSOR
502 MEMORY
503 STORAGE
504 INPUT-OUTPUT INTERFACE
5041 DISPLAY DEVICE
5042 INPUT DEVICE
5043 SOUND OUTPUT DEVICE
505 COMMUNICATION INTERFACE

What is claimed is:

1. A deterioration discrimination system comprising:
   an optical fiber cable strung between utility poles and in contact with a respective one of the utility poles;
   a communication unit configured to receive an optical signal from optical fibers included in the optical fiber cable;
   a detection unit configured to detect, based on the optical signal received by the communication unit, vibrations that are generated in the respective one of the utility poles; and
   a discrimination unit configured to discriminate, based on a vibration frequency of the vibrations that are generated during a specified period among the vibrations that are detected by the detection unit, deterioration of the respective one of the utility poles,
   wherein the specified period includes a period during which vibration intensity of the vibrations detected by the detection unit reaches a value equal to or greater than a predetermined value, and
   wherein each time the vibration intensity of the vibrations detected by the detection unit reaches the value equal to or greater than the predetermined value within the specified period, the discrimination unit extracts the vibration frequency that is obtained when the vibration intensity reaches the value equal to or greater than the predetermined value and falls within a predetermined frequency range and discriminates deterioration of the respective one of the utility poles based on the vibration frequency extracted a plurality of times.

2. The deterioration discrimination system according to claim 1, wherein the discrimination unit discriminates deterioration of the respective one of the utility poles using a trained model that has been trained using a training data that differs according to a type of the utility model.

3. The deterioration discrimination system according to claim 1, further comprising a notification unit configured to notify a predetermined notification destination of a state of deterioration of the respective one of the utility poles discriminated by the discrimination unit.

4. A deterioration discrimination apparatus comprising:
   at least one memory storing instructions, and
   at least one processor configured to execute the instructions to:
   receive an optical signal from optical fibers included in an optical fiber cable strung between utility poles and in contact with a respective one of the utility poles;
   detect, based on the optical signal that is received, vibrations that are generated in the respective one of the utility poles; and
   discriminate, based on a vibration frequency of the vibrations that are generated during a specified period among the vibrations that are detected, deterioration of the respective one of the utility poles,
   wherein the specified period includes a period during which vibration intensity of the vibrations that are detected reaches a value equal to or greater than a predetermined value, and
   wherein the at least one processor is further configured to execute the instructions to:
   each time the vibration intensity of the vibrations that are detected reaches the value equal to or greater than the predetermined value within the specified period, extract the vibration frequency that is obtained when the vibration intensity reaches the value equal to or greater than the predetermined value and falls within a predetermined frequency range and discriminates deterioration of the respective one of the utility poles based on the vibration frequency extracted a plurality of times.

5. The deterioration discrimination apparatus according to claim 4, wherein the at least one processor is further configured to execute the instructions to:

discriminate deterioration of the respective one of the utility poles using a trained model that has been trained using a training data that differs according to a type of the utility model.

6. The deterioration discrimination apparatus according to claim 4, wherein the at least one processor is further configured to execute the instructions to:
   notify a predetermined notification destination of a state of deterioration of the respective one of the utility poles that is discriminated.

7. A deterioration discrimination method for a deterioration discrimination apparatus, the deterioration discrimination method comprising:
   a receiving operation comprising receiving an optical signal from optical fibers included in an optical fiber cable strung between utility poles and in contact with a respective one of the utility poles;
   a detecting operation comprising detecting, based on the optical signal received in the receiving operation, vibrations that are generated in the respective one of the utility poles; and
   a discriminating operation comprising discriminating, based on a vibration frequency of the vibrations that are generated during a specified period among the vibrations that are detected in the detecting operation, deterioration of the respective one of the utility poles, wherein the specified period includes a period during which vibration intensity of the vibrations detected in the detecting operation reaches a value equal to or greater than a predetermined value, and wherein in the discriminating operation, each time the vibration intensity of the vibrations detected in the detecting operation reaches the value equal to or greater than the predetermined value within the specified period, the vibration frequency that is obtained when the vibration intensity reaches the value equal to or greater than the predetermined value and falls within a predetermined frequency range is obtained and deterioration of the respective one of the utility poles is discriminated based on the vibration frequency extracted a plurality of times.

8. The deterioration discrimination method according to claim 7, wherein in the discriminating operation, discrimination of the deterioration of the respective one of the utility poles is performed using a trained model that has been trained using a training data that differs according to a type of the utility model.

9. The deterioration discrimination method according to claim 7, further comprising a notifying operation comprising notifying a predetermined notification destination of a state of deterioration of the respective one of the utility poles discriminated in the discriminating operation.

* * * * *